United States Patent [19]

Nakayama et al.

[11] Patent Number: 4,653,037
[45] Date of Patent: Mar. 24, 1987

[54] MAGAZINE CONTAINING A PLURALITY OF DISC HOLDERS AND COMBINATION OF A RECORD DISC CHANGER WITH SUCH MAGAZINE

[75] Inventors: Mitsuhisa Nakayama; Yoshikazu Kawanaka, both of Kanagawa, Japan

[73] Assignee: U.S. Philips Corporation, New York, N.Y.

[21] Appl. No.: 658,110

[22] Filed: Oct. 5, 1984

[30] Foreign Application Priority Data

Oct. 8, 1983 [JP] Japan .............................. 58-155621[U]

[51] Int. Cl.⁴ ....................... G11B 17/04; G11B 17/26
[52] U.S. Cl. ......................................... 369/38; 369/34; 369/194
[58] Field of Search ................... 369/34, 36, 38, 194, 369/75.2

[56] References Cited

U.S. PATENT DOCUMENTS 2,891,797  6/1959  Hull et al. ............................... 369/38
4,170,030  10/1979  Castrodale et al. .................... 369/38
4,479,210  10/1984  Nakayama ............................. 369/75.2

Primary Examiner—Steven L. Stephan
Attorney, Agent, or Firm—F. Brice Faller

[57] ABSTRACT

A magazine has a main compartment in which disc-holders each provided with a record disc, are supported one above another. The disc-holders can slide into and out of the main compartment through an open side-wall of the magazine. The magazine can be raised and lowered in a record-disc changer to bring a selected disc-holder within the main compartment to a predetermined level at which the selected holder can slide out of the magazine and subsequently back into the magazine. The magazine includes an additional compartment located above the main compartment and separated therefrom by a separation wall. The additional compartment is open at the upper side so that an additional disc-holder can be loaded into the additional compartment from above. This additional disc-holder can also slide into and out of the additional compartment through the open side wall of the magazine. The same mechanism which slides the disc holders located in the main compartment operates on the disc holder in the additional compartment.

2 Claims, 3 Drawing Figures

MAGAZINE CONTAINING A PLURALITY OF DISC HOLDERS AND COMBINATION OF A RECORD DISC CHANGER WITH SUCH MAGAZINE

BACKGROUND OF THE INVENTION

The invention relates to a magazine containing a plurality of disc-holders, each holder containing a record disc, which magazine comprises a main compartment in which the disc-holders are supported one above another, which disc-holders can be slid into and out the main compartment through an open side-wall of the magazine, which magazine, after it has been mounted in a record-disc changer, can be raised and lowered to bring a selected disc-holder within the main compartment to a predetermined level at which said holder can be slid out of the magazine and subsequently back into the magazine.

A magazine of the above construction is described in British patent application No. 8321312 (PHJ 82.101c), published on Mar. 14, 1984, publication No. 2126004. Such a magazine may be used in conjunction with record-disc changers for playing record-discs contained in holders, for example optical audio discs, such as those known as "Compact Disc". When mounted in the record-disc changer, the magazine faces with its open side wall feed rollers of the changer and is located on a device for raising and lowering the magazine. This device brings a selected holder in the main compartment to a predetermined level at which the feed rollers can slide this holder in a horizontal direction from the magazine onto a loading support, which transfers this holder to the turntable of the record-disc changer. Thus a selected record-disc is played automatically.

If one of the record discs in the magazine must be replaced by another record-disc it is necessary to open an opening panel of the record-disc changer and to remove the magazine from the changer. This can only be done by removing one of the disc-holders through the open side wall of the compartment to replace it with the required disc. Furthermore, it is necessary to remember which disc-holder has been used while carrying out this operation. So mistakes can easily occur, whereas the operation of removing the magazine and substituting the record disc takes up a great deal of time.

SUMMARY OF THE INVENTION

It is the object of the invention to provide a magazine for a record disc-changer, in which magazine an additional disc can be loaded quickly and which disc can be replaced easily by another disc.

According to the invention, a magazine described in the opening paragraph is characterized in that the magazine comprises an additional compartment which is located above the main compartment and which is separated therefrom by a separation wall, said additional compartment being open at the upper side in such a way that an additional disc-holder can be loaded into said additional compartment from above, which additional disc-holder can also be slid into and out of the additional compartment through said open side wall of the magazine. Thus, the insertion of an additional disc holder, which houses a desired additional disc, can be carried out quickly by loading this disc holder from above into the additional compartment of the magazine. This additional compartment is established at the top side of the magazine, whereas the separation wall between the additional and the main compartment covers the main compartment at the top side, closing the main compartment for example against dust, which is important when the magazine is not in use and is stored outside the record-disc changer. When the additional holder is brought to the predetermined level in the record-disc changer the additional compartment faces the feed rollers of the changer with its open side wall, so that the holder can be slid by the feed rollers in the same way as the other holders in the main compartment.

A preferred embodiment of the invention is characterized in that said additional compartment has an aperture in a second side wall of the magazine at the opposite side of said open side wall for the passage of a transfer member of the record-disc changer, which member is operable to transfer the additional holder into and out of the additional compartment. Thus, the additional holder can be transferred to the feed rollers of the changer by passing the transfer member of the changer through the aperture in the second side wall at the location of the additional compartment.

The invention also provides a combination of a record-disc changer and a magazine according to the invention, which magazine can be placed into said record-disc changer through an opening in a side wall thereof. A preferred embodiment of the invention is characterized in that the record-disc changer has a loading opening situated above the additional compartment of the magazine for loading said additional holder. Thus, loading the additional holder with the desired record-disc can be carried out quickly by moving said holder through the loading opening of the record-disc changer, located above the additional compartment. Removal of the magazine may be omitted, the magazine may remain in its position inside the changer.

BRIEF DESCRIPTION OF THE DRAWINGS

An embodiment of the invention will now be described, by way of example, with reference to the accompanying drawings, in which.

DESCRIPTION OF THE PREFERRED EMBODIMENTS

Figure 1:
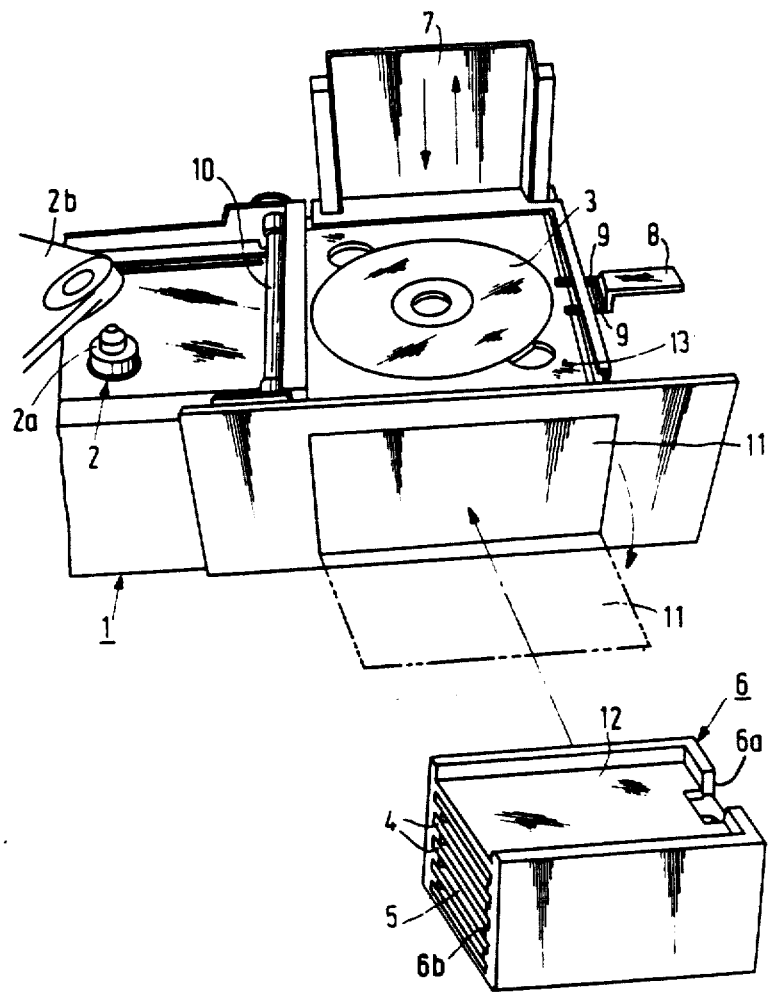
FIG. 1 is a perspective view of a part of a record-disc changer and a magazine of the changer, provided with a number of disc holders.

The record-disc changer 1, shown in FIG. 1, includes a player 2, provided with a turntable 2a and a pressure arm 2b, for reproducing and/or recording information discs. For example, the changer 1 is capable of playing discs having a diameter of 12 cm and known as "Compact Discs", which carry digital audio information on only one side. Since the amount of information on such a disc is large, the disc, bearing the reference numeral 3 in FIG. 2, has a long playing time. An example of such a record-disc changer is described in European Patent Application No. 83201622.4, published on May 30, 1984, publication No. 0109710. (PHJ 82.106c, herewith incorporated by reference).

The record disc-changer 1 (referred to as below as the changer) shown in FIG. 1 is used, by way of example, as reproduction equipment for a number of tunes which are divided among a plurality of compact discs 3

(referred to below as discs), located in disc holder 4, which discs are housed one above another so that they can be freely inserted and removed at a number of levels in a main compartment 5 of a magazine 6 for reproduction.

The record disc changer 1 comprises a raising and lowering device 7, which operates such that when a tune is selected, the magazine 6 is moved up and down by the device 7 in the changer. The changer 1 further comprises a transfer member 8 with gripper fingers 9. These fingers 9 can be moved through an aperture in the compartment 5 in a side wall 6a of the magazine. When a holder 4, which houses a disc 3 on which the selected tune has been recorded, has been moved to a predetermined level opposite to the fingers 9 of the member 8, this holder 4 is gripped by the fingers 9 and carried out through an open side wall 6b of the magazine at the opposite side of the wall 6a. A pair of feedrollers 10 transfer the holder 4 in a horizontal direction to the turntable 2a of the player 2. After the disc has been pressed onto the turntable 2a by the pressure arm 2b, the selected tune is reproduced automatically.

As shown in FIG. 1, the housing of the changer 1 comprises an opening cover 11 which is opened when the magazine 6 is being set in the changer.

Figure 2:
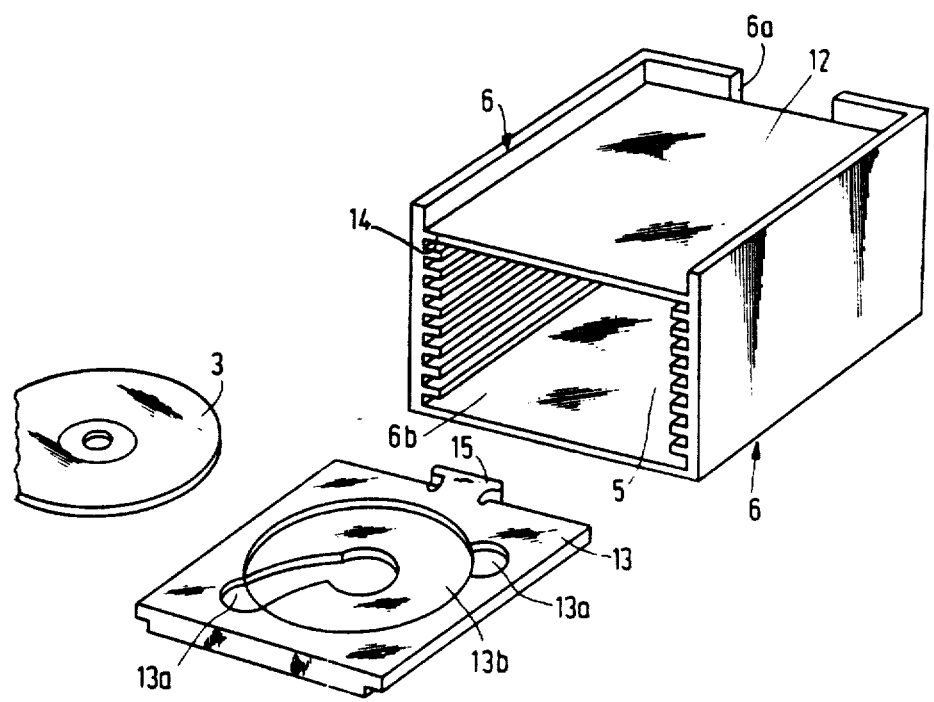
FIG. 2 is a perspective view of the magazine and an additional disc-holder.
Figure 3:
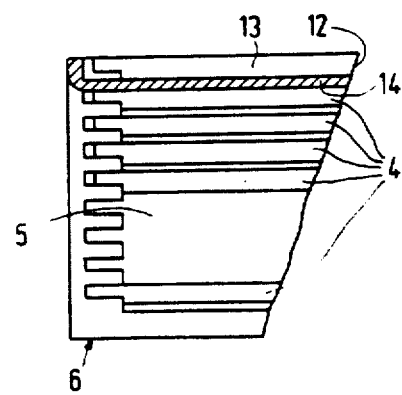
FIG. 3 is a sectional view of part of the magazine, containing a number of disc-holders.

As shown in FIGS. 2 and 3, the magazine 6 comprises at the upper side an additional compartment 12 for loading an additional disc-holder 13, in which is located a disc 3 on which another tune has been recorded. The disc-holder 13 has the same construction as the holders 4. The additional compartment 12 is open at the upper side in such a way that the aforementioned disc holder 13 can be loaded from above. The compartment 12 is separated from the compartment 5 by a separation wall 14.

The changer 1 can be switched to automatic operation or to manual operation. When it is set for automatic operation, only the disc-holders 4, which are housed in the main compartment 5, can be selected. If the changer 1 is switched to manual operation the raising and lowering device 7 operates in such a way that the magazine 6 is stopped in the predetermined position in which a tail 15 of the holder 13 in the additional compartment 12 is opposite to the fingers 9 of the member 8. The compartment 12 also has an aperture in the side wall 6a for passing the fingers 9.

When the desired tune is not recorded on any of the discs 3, which are housed in the main compartment 5, the magazine can be removed by opening the opening cover 11, and loading the additional disc holder 19, which carries the disc 3 on which the desired tune has been recorded, in the additional compartment 12 of the magazine 6. This holder 13 can be set easily and precisely on the magazine 6. If, after setting the magazine 6 back in the changer 1, the changer is then set to manual operation, the holder 13 in the additional compartment 12 is transferred automatically to the player 2 via the pair of rollers 10 and the desired tune which has been recorded on the additional disc 3 in the holder 13 is reproduced.

An opening cover may be arranged above the additional compartment 12 in the housing of the changer 1 (not shown) so that the holder 13 may be loaded into the additional compartment 12 via this opening. If this opening cover is present at the top side of the housing, the operation of opening the opening cover 11 and removing the magazine 6 may be omitted. It is also possible to leave the holder 13 in the compartment 12 and to remove the disc 3 only. This removal is easy because the holder 13 comprises two finger-openings 13a beside the disc-housing 13b of the holder.

What is claimed is:

1. A combination of a record disc changer and a magazine for containing a plurality of disc holders, each said disc holder containing a record disc, said magazine being adapted for mounting in said record disc changer with said discs substantially horizontal, said changer including means for raising and lowering said magazine to bring any of said disc holders to a preselected level, and transport means for sliding said disc holder at said preselected level out of and back into said magazine, said magazine comprising a main compartment including a top, bottom and sides, one side being open for allowing said disc holders to slide out of and back into said main compartment, means for supporting said disc holders within said main compartment one above another, an additional compartment located above said main compartment and including means for supporting an additional disc holder parallel to said holders in said main compartment, said top of said main compartment separating said main and additional compartments, said additional compartment being open at said one side to allow said additional disc holder to slide out of and into said additional compartment, the top of said additional compartment being open to receive said additional disc holder in said additional compartment, said disc changer including a first opening in a side wall thereof, said magazine being inserted into said record disc changer through said first side opening of said disc changer, said disc changer further including a second opening positioned above said magazine when said magazine is mounted in said disc changer, then second opening exposing said open top of said additional compartment, said additional disc holder being insertable into said additional compartment through said second opening in said record disc changer.

2. A combination as claimed in claim 1, wherein said additional compartment further includes an aperture in the side of said additional compartment opposite from said one open side, said aperture allowing passage therethrough of a transfer member of said record disc changer, said transfer member being operable to transfer said additional disc holder into and out of said additional compartment when said magazine is vertically positioned to place said additional disc holder at said preselected level.

* * * * *